(12) United States Patent
Yao

(10) Patent No.: US 12,405,121 B2
(45) Date of Patent: Sep. 2, 2025

(54) MOTOR MECHANICAL ENERGY BASED MOBILE VEHICLE CARBON EMISSION COMPUTATION METHOD

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 82 days.

(21) Appl. No.: 18/399,575

(22) Filed: Dec. 28, 2023

(65) Prior Publication Data

US 2024/0219190 A1    Jul. 4, 2024

(30) Foreign Application Priority Data

Dec. 30, 2022    (TW) ................... 111150903

(51) Int. Cl.
*G01C 21/34* (2006.01)
*B60L 50/75* (2019.01)

(52) U.S. Cl.
CPC .......... *G01C 21/3469* (2013.01); *B60L 50/75* (2019.02)

(58) Field of Classification Search
CPC ...... G01C 21/3469; G07C 5/08; G07C 5/008; G06F 3/04842; G06F 3/0481; G08G 1/22; G05D 1/0088; G05D 1/0287; H04W 4/21; H04W 4/44; H04W 4/46; H04W 4/026; B60L 3/12; B60L 50/75; B60L 58/00; B60L 58/10; B60L 58/12; B60L 58/13; B60L 58/14; B60L 2260/54; B60L 2240/421; B60L 2240/622; B60L 2240/70; B60L 2270/12; B60L 2240/423

USPC ...................................................... 701/22, 123
See application file for complete search history.

(56) References Cited

U.S. PATENT DOCUMENTS

| | | | |
|---|---|---|---|
| 2012/0116792 A1* | 5/2012 | Lee ........................ | G06Q 90/00 708/235 |
| 2019/0377312 A1* | 12/2019 | Nakai .................. | G05B 19/102 |
| 2023/0401585 A1* | 12/2023 | Knight ................ | G06F 11/3062 |

* cited by examiner

*Primary Examiner* — Hai H Huynh
*Assistant Examiner* — Johnny H Hoang
(74) *Attorney, Agent, or Firm* — Leong C. Lei

(57) ABSTRACT

High frequency reading of position information is performed by a control module, and a torque and a rotation angle outputted from a motor are used, at small angle, for calculation of unit mechanical energy that is summed up in a summation operation unit to form a summed mechanical energy. All summed mechanical energies of a journey, and corresponding position information, are uploaded to the cloud for conversion into carbon emissions of the round of journey. The high frequency measurement and the summing-up operation make it possible to greatly increase the accuracy of mechanical energy outputted from a mobile vehicle in a journey, without causing faulty estimation of the carbon emission of each round of journey. Peripheral computation technology is adopted for reducing bandwidth loading for uploading to the cloud and increasing the uploading speed to further reduce the loading of the cloud server for operation, storage, and processing data.

6 Claims, 5 Drawing Sheets

MOTOR MECHANICAL ENERGY BASED MOBILE VEHICLE CARBON EMISSION COMPUTATION METHOD

BACKGROUND OF THE INVENTION

(a) Technical Field of the Invention

The present invention belongs to the technical field of computation of mobile vehicle carbon emission.

(b) Description of the Prior Art

Heretofore, carbon emission of an electrical vehicle is calculated on the basis of consumption of electrical energy of an electrical battery during a journey. Methods that are commonly adopted for measuring electrical power of an electrical battery mainly include (1) externally measuring the voltage of a battery set; and (2) applying a battery management system inside a battery set to measure the voltage. However, when the loading is suddenly increased (output current being increased), the voltage of the battery drops down, so that there may be faults if the voltage is used solely in determining the residual power. Further, during a period of use, the battery is repeatedly charged and discharged, and consequently, the battery pack becomes deteriorating, resulting in an increase of internal resistance, and this also causes faults in the determination of electrical power. To alleviate the problem of battery pack deterioration, lithium-iron battery packs that are capable of being charged and discharged for more times have been widely used. However, the characteristics of the lithium-iron battery are such that the voltage variation is relatively small during the processes of charging and discharging, and this similarly results in difficulty of accurately estimating the residual electrical power of the battery.

In other words, when the residual power of a battery is mistakenly estimated, calculation of the electrical power of the battery that has been consumption is also incorrect, and this results in mistaken calculation of the carbon emission of an electrical vehicle during each journey thereof. Further, the calculation of the carbon emission that is implemented currently is constrained by transmission bandwidth and speed, and server capacity and the calculation of carbon emission of a journey of the electrical vehicle can only be computed by taking the distance of the journey and the residual capacities of power at starting and ending of the journey as a calculation basis. This leaves room for counterfeiting and cheating, and consequently, the carbon emission cannot be truly and correctly computed. The invention is made to overcome the above problems.

SUMMARY OF THE INVENTION

The primary objective of the present invention is to use technology of high frequency measurement, peripheral computation, and summing operation to greatly increase calculation accuracy of carbon emission for each journey, so as to allow all the people to well use of green mobile vehicles, to effectively engage in trading of carbon credit, and also to create sharing economics for carbon credit market.

Another objective of the present invention is to adopt a means of high frequency measurement to inspect, according to whether output of a motor corresponds to variation and change of position information, a true situation of use, in order to reduce events of counterfeiting and cheating for carbon emission to truly achieve the purposes of reducing greenhouse gases.

A further objective of the present invention is to use peripheral computation technology to reduce bandwidth loading for uploading to cloud and to increase the uploading speed to further reduce the loading of operation, storage, and processing of the cloud server.

DETAILED DESCRIPTION OF THE PREFERRED EMBODIMENTS

Figure 1:
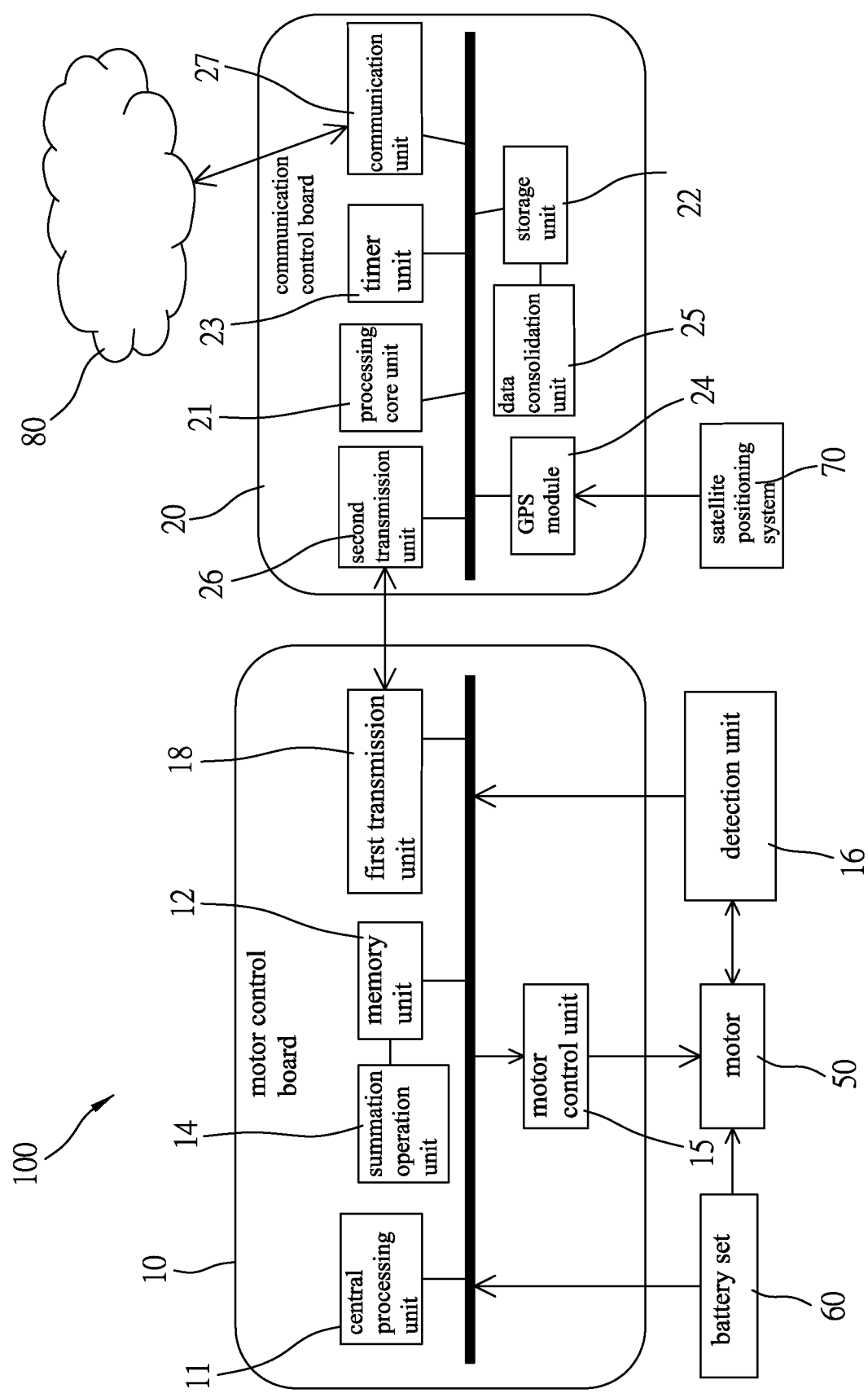
FIG. 1 is a schematic view showing system architecture of a preferred embodiment of the present invention.

As shown in FIG. 1, the present invention is applicable to a control module 100 that is operable to control a motor 50 and a battery set 60 of a mobile vehicle. The control module 100 comprises a motor control board 10 and a communication control board 20. The motor control board 10 includes a central processing unit 11, and a memory unit 12, a motor control unit 15, at least one detection unit 16, and a first transmission unit 18 connected with the central processing unit 11, wherein the central processing unit 11 is configured for executing and processing various programs, data, and instructions, and the memory unit 12 is configured for storing programs, output mechanical energy calculation formulas, measurement data, and summation calculation result data, and also, the memory unit 12 further comprises a summation operation unit 14 that is configured for summing up multiple mechanical energy calculation results of a same journey, and further, the motor control unit 15 is configured for connecting with an external motor 50 to operate and control operation of the motor 50, and further, the detection units 16 are arranged on a loading path of an output shaft of the motor 50 to measure torque and rotation angle of the output shaft of the motor 50, and further, the first transmission unit 18 is configured for mutual data transmission of the motor control board 10 and the communication control board 20, and according to some embodiments, the central processing unit 11, the memory unit 12, the motor control unit 15, and/or the first transmission unit 18 are an integrated semiconductor device.

The communication control board 20 includes a processing core unit 21, and a storage unit 22, a timer unit 23, a GPS module 24, a second transmission unit 26, and a communication unit 27 connected with the processing core unit 21, wherein the processing core unit 21 is configured for executing and processing various programs, data, and instructions, and the storage unit 22 is configured for storing programs and in various sorts of data, and also, the storage unit 22 further comprises a data consolidation unit 25 that consolidates a summation result of mechanical energy of a same journey, and journey position and distance, and further, the GPS module 24 is configured for connecting with at least one external positioning satellite system 70 to read journey position and distance, and further, the second transmission unit 26 is configured for connecting with the first transmission unit 18 of the motor control board for mutual data transmission, and the communication unit 27 is configured for connecting, through a network, with an external cloud server 80 for data uploading, and further, the timer unit 23 is configured for setting a frequency at which the GPS module 24 is operated to read the journey position and distance and the communication unit 27 is operated for data uploading, and further, according to some embodiments, the processing core unit 21, the storage unit 22, the timer unit 23, the second transmission unit 26, and/or the communication unit 27 are an integrated semiconductor device.

Figure 3:
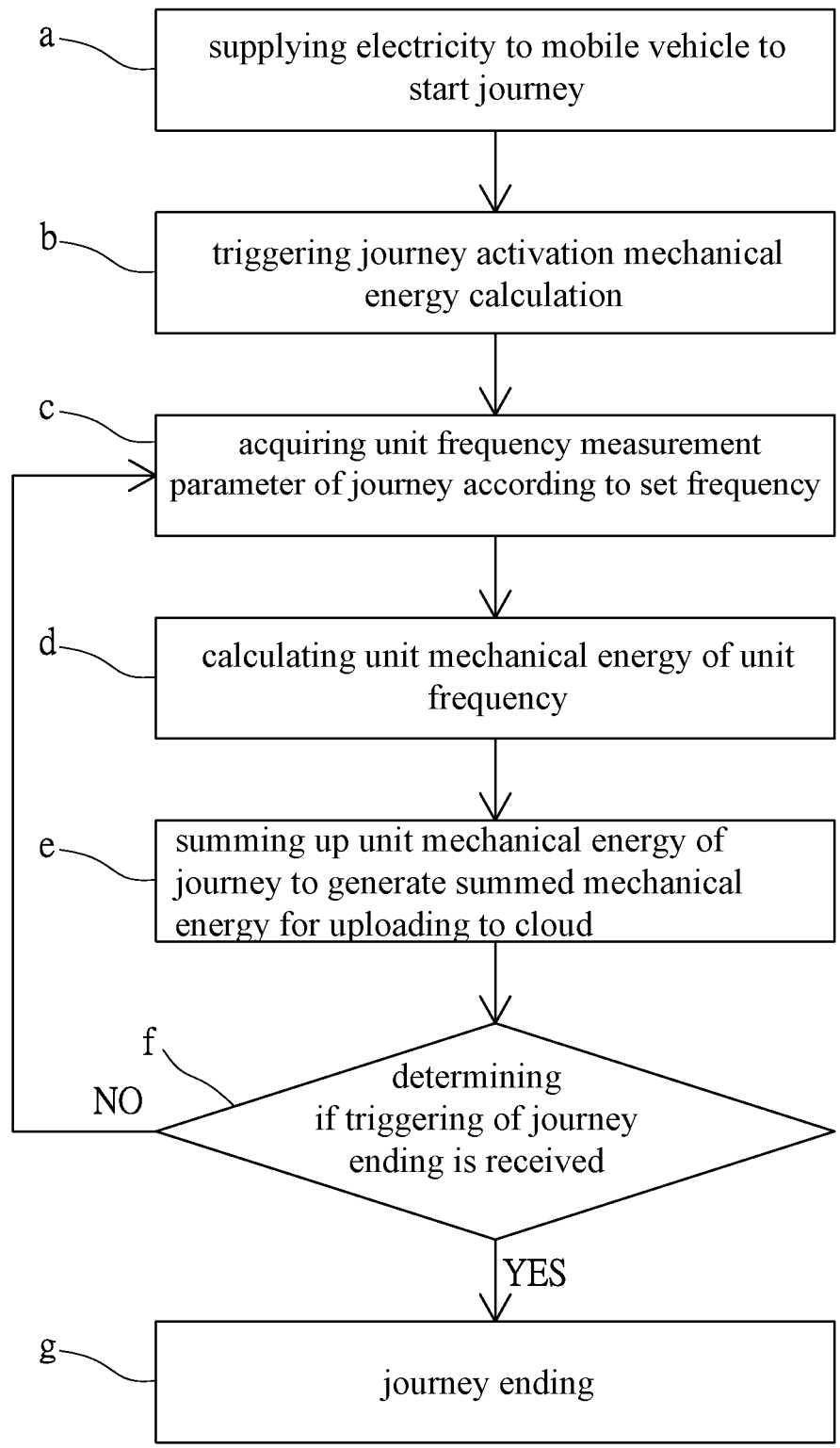
FIG. 3 is a schematic view showing a flow of a method according to the present invention.
Figure 4:
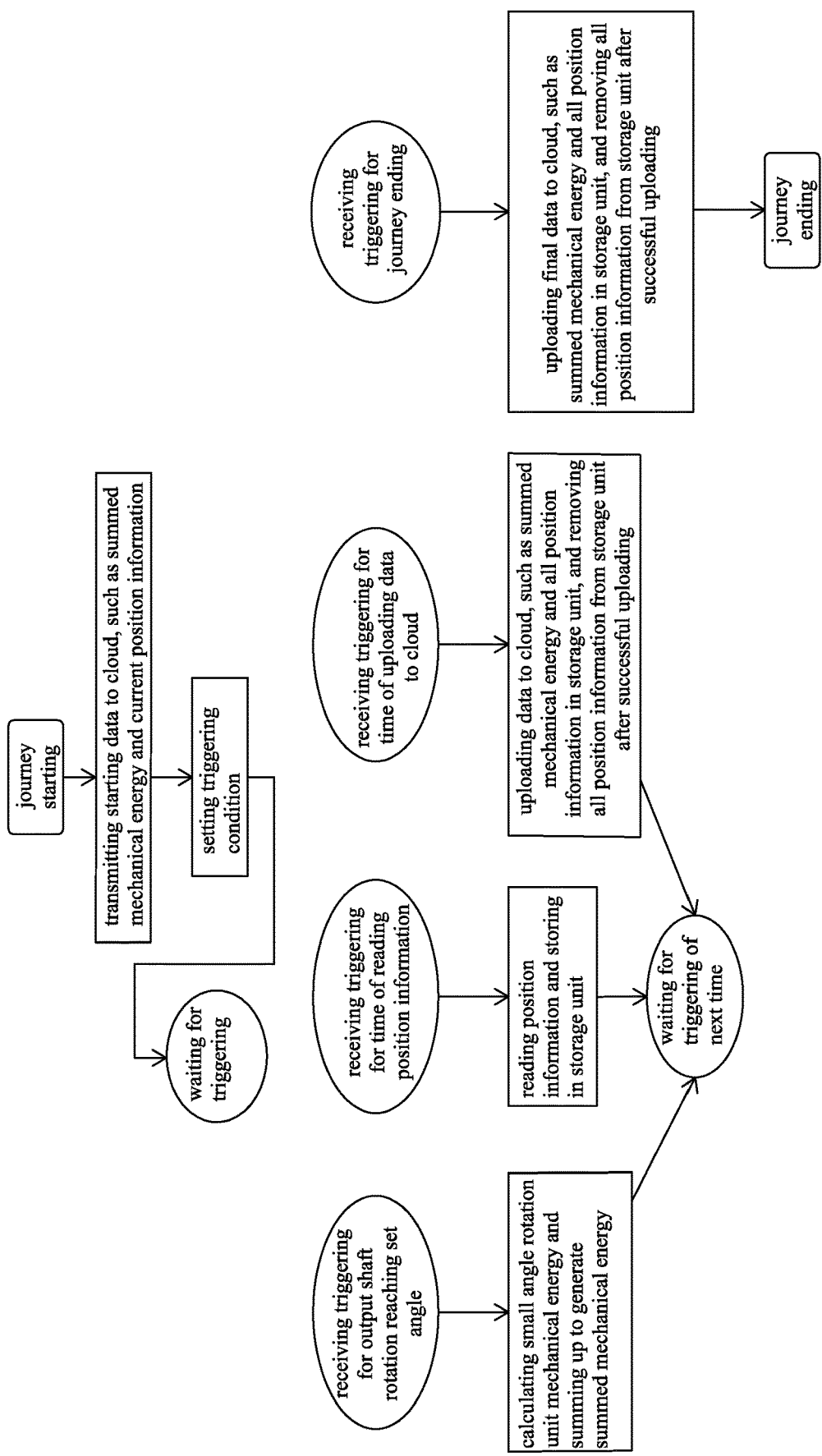
FIG. 4 is a schematic view showing application architecture of actual implementation of the present invention.

In practical application of the present invention, as shown in FIGS. 1, 3, and 4, the control module 100 is used to calculate, through high frequency measurement and by means of peripheral technology, at least one unit mechanical energy outputted by the motor 50 in a same journey of a mobile vehicle, and summing up all unit mechanical energies of the journey to generate a summed mechanical energy, and uploading the summed mechanical energy for conversion into journey carbon emission for trading of carbon credit, and before the present invention is used, various settings for operation and control are made in advance in programs executed by the central processing unit 11 of the motor control board 10 and the processing core unit 21 of the communication control board 20 of the control module 100, at least including setting of triggering condition and measurement frequency [such as making one measurement for the output shaft rotation angle reaching 10 degrees], setting of reading frequency [such as reading one time per every 10 seconds], and setting of uploading time [time interval for each time of uploading data, such as uploading one time per every 60 seconds], and the steps of a flow of a motor mechanical energy based mobile vehicle carbon emission computation method according to the present invention are as follows:

(a) supplying electricity to mobile vehicle to start journey: when a mobile vehicle is prepared for executing a journey, electrical power of the mobile vehicle is first activated, and the communication unit 27 of the communication control board 20 starts executing transmission of journey starting data of the mobile vehicle stored in the memory unit 12 and the storage unit 22 of the motor control board 10 and the communication control board 20 to the cloud, including, but not limited to, summed mechanical energy and current position, and waiting for a user to externally trigger the motor 50 to drive the mobile vehicle to execute Step (b);

(b) triggering journey activation mechanical energy calculation: when the user triggers the motor 50 to drive, by means of the output shaft thereof, the mobile vehicle, an input electrical power of the battery set 60 is applied to drive the motor 50, and when the detection units 16 of the motor control board 10 detect the output shaft rotation angle reaches a set value [such as 10 degrees], the system is internally triggered to execute Step (c), and the central processing unit 11 of the motor control board 10 uses mechanical energy programs stored in the memory unit 12 to calculate, according to the rotation angle and torque detected by the detection units 16, the mechanical energy externally triggering the motor 50, the mechanical energy of externally triggering being defined as triggering mechanical energy and stored in the memory unit 12;

(c) acquiring unit frequency measurement parameter of journey according to set frequency: when the mobile vehicle is triggered and driven, the communication control board 20 of the control module 100 uses the GPS module 24 to read, according to the set frequency of the timer unit 23 [such as every 10 seconds], position information of the mobile vehicle, and stores the position information of each unit frequency sequentially in the storage unit 22, and the detection units 16 of the motor control board 10 measure, according to the set frequency [such as every 10 degrees], rotation angle and torque of the output shaft of the motor 50, and stores the rotation angle and torque of each unit frequency sequentially in a buffer of the memory unit 12 for subsequent execution of Step (d);

(d) calculating unit mechanical energy of unit frequency: after the acquisition of the rotation angle and torque of unit frequency, the mechanical energy programs in the central processing unit 11 of the motor control board 10 calculate, according to the parameters of rotation angle and torque, the mechanical energy of the motor 50 for each unit frequency, and the mechanical energy of the unit frequency is defined as unit mechanical energy, and each unit mechanical energy is stored sequentially in the memory unit 12 for subsequent execution of Step (e);

(e) summing up unit mechanical energy of journey to generate summed mechanical energy for uploading to cloud: after completion of calculation of multiple unit mechanical energies, according to set condition of uploading time, such as one uploading per every 60 seconds, a summation operation is applied to the unit mechanical energies that have been calculated but have not yet been summed up to generate a summed mechanical energy, and the communication unit 27 of the communication control board 20 uploads the summed mechanical energy and position information stored in the memory unit 12 and the storage unit 22 to a designated cloud server 80, and also removes the already-uploaded position information from the storage unit 22 after successful uploading, and executing Step (f);

(f) determining if triggering of journey ending is received: after completion of uploading of each summed mechanical energy, a determination is made as to whether or not triggering of journey ending is received, and if the system does not receive ending of the journey, cyclically executing Step (c) to Step (e), otherwise when triggering of ending of the journey is received, executing Step (g); and (g) journey ending: when the system receives triggering of journey ending, such as the battery set 60 of the mobile vehicle terminating input of electrical power to the motor 50, the communication unit 27 of the communication control board 20 uploads final data in the memory unit 12 and the storage unit 22 of the motor control board 10 and the communication control board 20 to the designated cloud server 80, including, but not limited to, summed mechanical energy and position information, and also, removes the already-uploaded position information when the uploading is successful, and ends the journey, to allow the designated cloud server 80 to convert, through calculation, the triggering mechanical energy, the multiple summed mechanical energies, and position information of the journey of the mobile vehicle that are so uploaded into carbon emissions, and summing up to form a journey total carbon emission for subsequent operation of trading of carbon credit.

Figure 5:
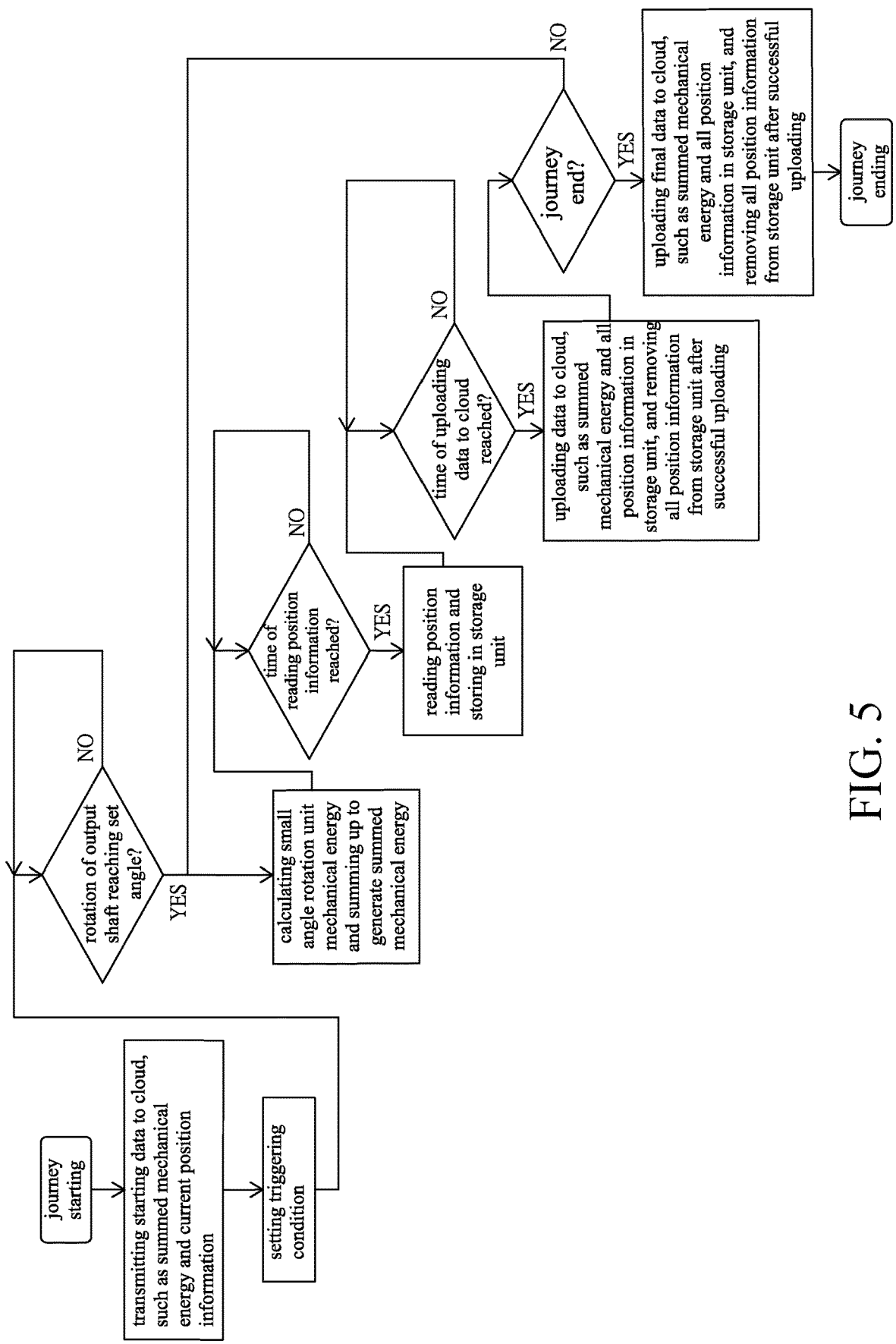
FIG. 5 is a schematic view showing an application flow of actual implementation of the present invention.

As shown in FIG. 5, which shows an operation flow of a preferred embodiment of the present invention, when the mobile vehicle starts a journey, the control module 100 transmits starting data to a designated server 80 in cloud, such as the summed mechanical energy and current position information not removed from the memory unit 12; and determines if the detected the rotation angle of trigging activation of the motor 50 reaches a set value, and if not, continuing to wait for triggering, otherwise when it does, applying the detected torque and rotation angle to calculate the triggering mechanical energy, and continuing to determine if time of reading position information is reached, and if not, then continuing to wait for the reading time of the next unit frequency to reach, otherwise if the reading time of the unit frequency is reached, then reading position information for storing, and inspecting, according to small rotation angle setting value, the torque and rotation angle of the output shaft of the motor 50 to calculate the unit mechanical energy of the unit frequency and sequentially summing up the unit mechanical energies to generate a summed mechanical energy, and then continuing to determine if time of uploading data to the cloud is reached, and if not, continuing to wait for the uploading time of the next unit frequency to reach, otherwise if the uploading time is reached, then uploading data to the cloud, including, but not limited to, the triggering mechanical energy, the summed mechanical energy and position information, and removing the already-uploaded position information after successful uploading, and then continuing to determine if the journey ends, and if not yet ending the journey, then repeatedly executing the above operation, otherwise if ending journey is triggered, then uploading final data to the cloud, including, but not limited to, the summed mechanical energy and position information, and removing the already-uploaded position information after successful uploading, meanwhile ending the journey.

Figure 2:
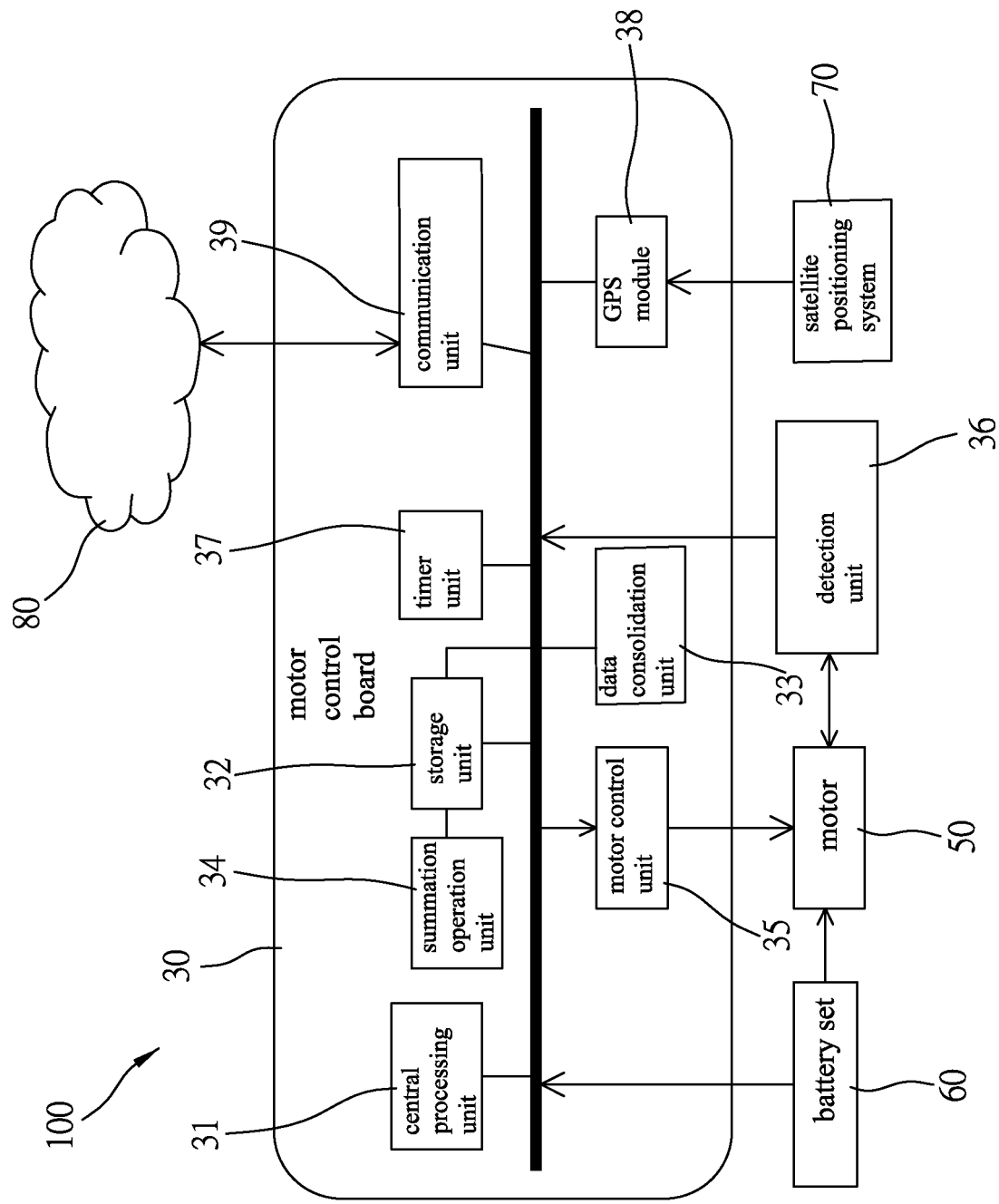
FIG. 2 is a schematic view showing system architecture of another preferred embodiment of the present invention.

According to some embodiments, as shown in FIG. 2, the control module 100 is formed of a motor control board 30, and the motor control board 30 includes a central processing unit 31, and a storage unit 32, a motor control unit 35, at least one detection unit 36, a timer unit 37, a GPS module 38, and a communication unit 39 connected with the central processing unit 31, wherein the central processing unit 31 is configured for executing and processing various programs, data, and instructions, and the motor control unit 35 is configured for connecting with an external motor 50 to operate and control operation of the motor 50, and further, the detection units 36 are arranged on an output shaft of the motor 50 to measure rotation angle and torque of the output shaft of the motor 50, and the storage unit 32 is configured for storing programs, mechanical energy calculation formulas, measurement data and summation calculation result data, and also, the storage unit 32 further comprises a summation operation unit 34 that is configured for summing up multiple results of calculation of mechanical energy of a same journey and a data consolidation unit 33 that is configured for consolidating the summed result of mechanical energy outputted in the journey, and the journey position and distance, and further, the GPS module 38 is configured for connecting with an external positioning satellite system 70 for reading journey position and distance, and further, the communication unit 39 is configured for connecting, through a network, with an external cloud server 80 for data uploading, and further, the timer unit 37 is configured for setting a frequency at which the GPS module 38 reads the position information of the mobile vehicle, and a frequency at which the communication unit 39 uploads data, this being similarly applied to execute the carbon emission computation method of the present invention.

It can be appreciated from the above that the present invention uses the control module 100 to read, with high frequency, position information, and to calculate unit mechanical energy through torque output of small rotation angle, and to sum up the unit mechanical energies to form a summed mechanical energy and subsequently uploading all the summed mechanical energies of a journey and corresponding position information to the cloud for comparison for verification and conversion into carbon emission of the journey, and by means of high frequency measurement and summing-up operation, the accuracy of mechanical energy of the mobile vehicle outputted in the journey can be increased, without causing faulty estimation of the carbon emission of each journey, and peripheral computation technology is adopted for reducing bandwidth loading for uploading to the cloud and increasing the uploading speed to further reduce the loading of the cloud server 80 for operation, storage, and processing data, and by adopting a means of high frequency measurement to inspect whether the output of the motor 50 corresponds to variation and change of position information for further applying to verification of true situation of use, in order to reduce room of counterfeiting and cheating, allowing the carbon emission of the mobile vehicle to be truly and correctly computed for applying to carbon credit trading of the individual using an electrical vehicle to conduct trading of carbon credit, and also to allow the issue of greenhouse gas reduction to be truly resolved and to create and invigorate the green mobile vehicle industry.

I claim:

1. A motor mechanical energy based mobile vehicle carbon emission computation method, which is applicable to a control module of a mobile vehicle that is operable to control a battery set to drive a motor, the control module at least comprising a central processing unit, and a storage unit, a motor control unit that controls the motor, at least one detection unit that detects a torque and a rotation angle outputted from the motor, a timer unit, a GPS module that is connectable with at least one external positioning satellite system, and a communication unit that transmits data to at least one external cloud server, all in connection with the central processing unit, wherein the storage unit further comprises a summation operation unit and a data consolidation unit, steps of the carbon emission computation method comprising:

(a) supplying electricity to mobile vehicle to start journey: activating a power supply to prepare to execute a journey, and waiting for external triggering of the motor to drive a motion of the mobile vehicle, and then executing Step (b);

(b) triggering journey activation mechanical energy calculation: after the external triggering of the motor, using the detection unit to detect if the rotation angle of the motor reaches a set value, which is internal triggering, and executing Step (c), and also calculating mechanical energy of the external triggering, the mechanical energy of the external triggering being defined as triggering mechanical energy and stored in the storage unit;

(c) acquiring unit frequency measurement parameter of journey according to set frequency: using the GPS module to read, according to a frequency set by the timer unit, position information of the mobile vehicle, and measuring, according to a set frequency, a rotation angle and a torque of the motor for subsequently executing Step (d);

(d) calculating unit mechanical energy of unit frequency: calculating mechanical energy of the motor for each unit frequency according to parameters of the previously acquired rotation angle and torque, the mechanical energy of said unit frequency being defined as unit mechanical energy for subsequently executing Step (e);

(e) summing up unit mechanical energy of journey to generate summed mechanical energy for uploading to cloud: according to a set condition for uploading time, summing up unit mechanical energies that are already calculated but not summed up to generate a summed mechanical energy, and uploading the summed mechanical energy and the position information to a designated cloud server, and executing Step (f);

(f) determining if triggering of journey ending is received: determining whether or not triggering for journey ending is received, and Step (c) to Step (e) are cyclically executed if triggering of ending journey is not received, and otherwise, executing Step (g) if triggering of ending journey is received; and (g) journey ending: uploading final data, including, but not limited to the summed mechanical energy and the position information, to the designated cloud server when the triggering of journey ending is received, to allow the cloud server to convert the triggering mechanical energy, the summed mechanical energy, and the position information uploaded in the journey into carbon emissions for summing up to form a journey total carbon emission for subsequent carbon credit trading operations.

2. The motor mechanical energy based mobile vehicle carbon emission computation method according to claim 1, wherein the set value for detecting the driving rotation angle of the motor in Step (b) of triggering journey activation mechanical energy calculation is 10 degrees.

3. The motor mechanical energy based mobile vehicle carbon emission computation method according to claim 1, wherein the frequency set by the timer unit for the GPS module in Step (c) of acquiring unit frequency measurement parameter of journey according to set frequency is to read the position information of the mobile vehicle one time for every 10 seconds.

4. The motor mechanical energy based mobile vehicle carbon emission computation method according to claim 1, wherein the frequency set for the detection unit to detect the rotation angle of the motor in Step (c) of acquiring unit frequency measurement parameter of journey according to set frequency is to measure information of torque of the motor one time for 10 degrees.

5. The motor mechanical energy based mobile vehicle carbon emission computation method according to claim 1, wherein the uploading time in Step (e) of summing up unit mechanical energy of journey to generate summed mechanical energy for uploading to cloud is uploading one time every 60 seconds.

6. The motor mechanical energy based mobile vehicle carbon emission computation method according to claim 1, wherein the control module comprises a motor control board and a communication control board, and the motor control board comprises a central processing unit, and a memory unit, a motor control unit operating and controlling the motor, at least one detection unit that detects a torque and a rotation angle of the motor, and a first transmission unit, all connected with the central processing unit, wherein the memory unit further comprises a summation operation unit, and the communication control board comprises a processing core unit, and a storage unit, a timer unit, a GPS module that is connectable with at least one external positioning satellite system, a second transmission unit that is connectable with the first transmission unit, and a communication unit that transmits data to at least one external cloud server, all connected with the processing core unit, wherein the storage unit further comprises a data consolidation unit.

\* \* \* \* \*